United States Patent

[11] 3,581,594

[72] Inventor Donald W. Longshore
  New Berlin, Wis.
[21] Appl. No. 887,163
[22] Filed Dec. 22, 1969
[45] Patented June 1, 1971
[73] Assignee Allis-Chalmers Manufacturing Company
  Milwaukee, Wis.

[54] SHIFT RAIL STOP
  10 Claims, 4 Drawing Figs.
[52] U.S. Cl. ................................................ 74/475,
  74/477
[51] Int. Cl. ..................................................... G05g 9/00

[50] Field of Search........................................... 74/475,
  477, 473, 476

[56] References Cited
  UNITED STATES PATENTS
  3,452,614  7/1969  Conkle........................ 74/477

Primary Examiner—Milton Kaufman
Attorneys—Arthur L. Nelson, Robert B. Benson and Kenneth C. McKivett ABSTRACT: A detent mechanism on a shift rail to define shift positions of the rail and stops to prevent overshifting of the shift rail.

PATENTED JUN 1 1971  3,581,594

Inventor
Donald W. Longshore

Attorneys

SHIFT RAIL STOP

This invention relates to a gearshift mechanism for a transmission and more particularly to a detent mechanism having an overshift stop to limit the axial movement of the shift rail.

Manual transmissions of conventional design provide a plurality of shift rails which slide axially to engage desired gear ratios. Each shift rail carries a shifting fork which shifts gears in response to the axial movement of the shift rail by a control lever. Stop means may be provided on the control cover to limit the axial movement of the rail to prevent movement of the shift fork beyond the position required to shift the transmission.

Conventional stops for the shift rails may be provided by spacers or washers on the shift rail which engage an abutment on the control cover. The number of washers depend on the machining tolerance and is determined by measurement during the assembly which increases the assembly cost. Another method is to provide machine pads in the control lever cover which the shift rail will engage and prevent it from overshifting. This also requires additional machining operations and additional cost in construction of the transmission.

Accordingly this invention provides a means whereby the shift rail can be provided with a limit stop to prevent a shift rail from overshifting. The shift rail is provided with a detent mechanism to resiliently retain the shift rail in a plurality of positions. The detent mechanism resiliently biases the detent element to engage a recess defined by the shift rail. The detent element engaging the detent groove holds the shift rail in the desired position. The addition of a stop in combination with the detent mechanism is relatively simple and provides a limit for the axial slidable movement of the shift rail. Accordingly this invention includes such a shift stop for preventing overshifting of the shift rail. The detent element rides in a recess defining shoulders on the shift rail which are engaged by the detent element which is not permitted to rise out of the recess. Accordingly the shift rail axial movement is limited.

It is an object of this invention to provide a detent mechanism and shift rail stop on a transmission.

It is another object of this invention to provide a shift rail stop on the shift control cover for limiting the axial movement of the shift rail.

It is a further object of this invention to provide a detent and stop mechanism for a shift rail having a resiliently biased detent element operating as the detent mechanism and a spacer for locking the detent element which engages a shoulder on the shift rail to limit the axial movement of the shift rail.

The objects of this invention are accomplished by providing a shift rail with grooves which received the detent element. The grooves formed in the shift rail determine the shift rail position for the neutral or the shift position of the transmission. A shallow recess is formed to overlap the groove which forms a shoulder on the shift rail. A detent mechanism comprising a resiliently biased element seats in the groove while a stop element in the detent mechanism prevents the detent from rising out of the recess on the shift rail as it engages the shoulder and limits the axial movement of the shift rail. Accordingly, the detent and stop mechanism provides a detent function as well as a movement limiting function for the shift rail.

Referring to the drawings the preferred embodiment of this invention is illustrated.

Figure 2:
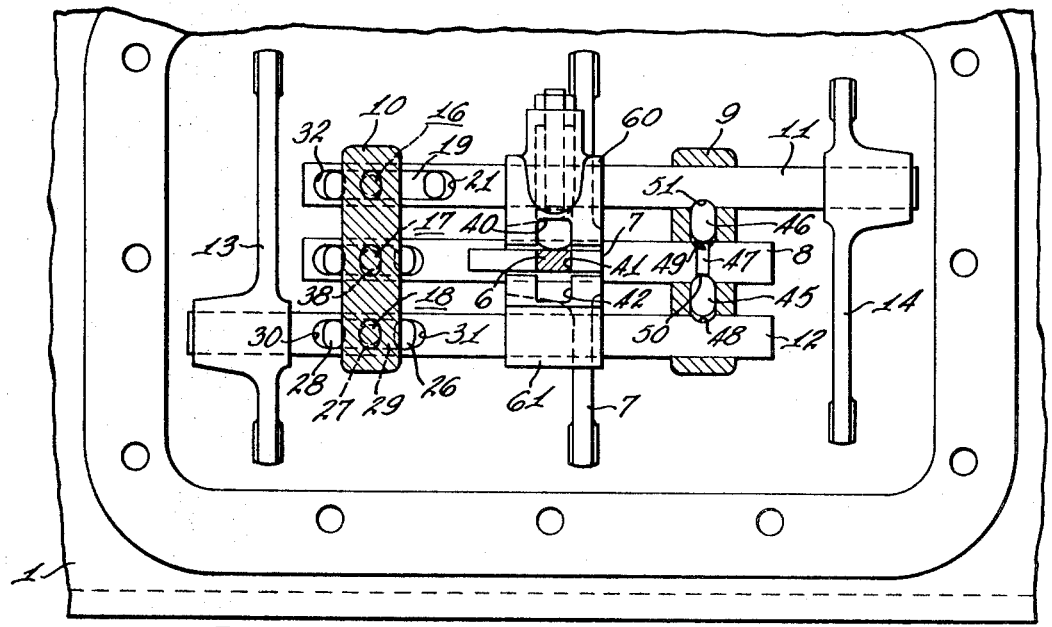
FIG. 2 is a plan view of FIG. 1 with parts removed to better show the invention.
Figure 1:
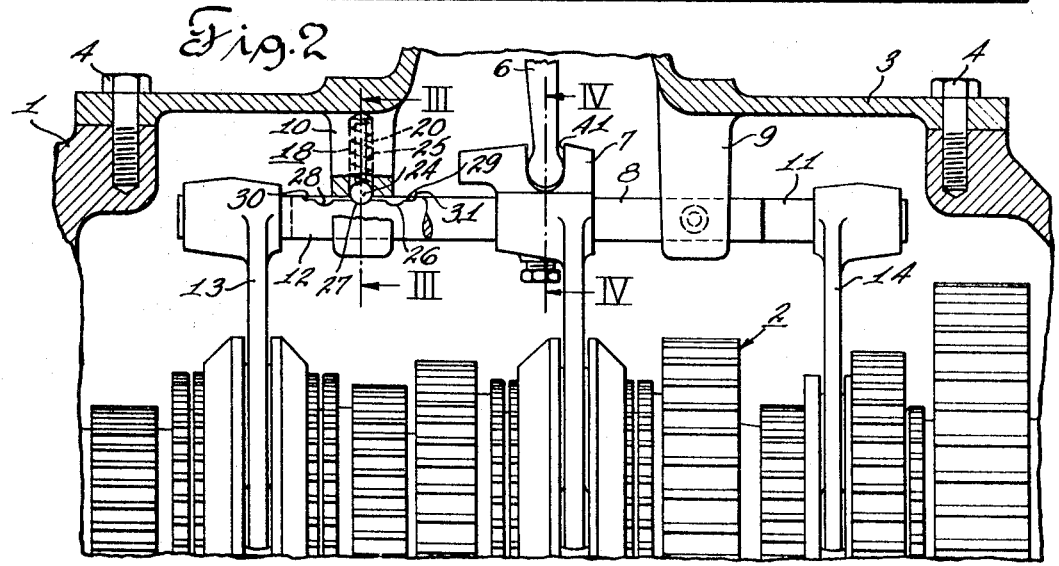
FIG. 1 is a side view in cross section of the transmission.

Referring to the drawings a housing 1 receives the transmission 2. The control cover 3 is fastened to the housing 1 by means of a plurality of bolts 4. The shift lever 6 extends through the cover 3 on the housing 1 and engages the shift fork 7. The shift fork 7 rides on the shift rail 8. The shift rail 8 is supported on depending supports 9 and 10. The supports 9 and 10 form openings for receiving the shift rails 11, 8 and 12. The shift rail 12 carries a shift fork 13 and the shift rail 11 carries a shift fork 14. Each shift fork engages a collar to shift gears in the transmission. The shift lever 6 selectively engages one of the lugs 60 or 61 or the fork 7 to move the mating shift rail for shifting gears.

Referring to FIG. 2 the control cover 3 is removed to show the shift rails. The shift rails 8, 11 and 12 are shown supported in parallel relationship in the dependent supports 9 and 10. A plurality of detent mechanisms 16, 17 and 18 are positioned in the support 10. The ball 24 of the detent 18 is biased downwardly by the spring 25. The pin 20 received within the hole 23 is of the predetermined length to limit the upward movement of the ball 24. A plurality of grooves 26, 27 and 28 are formed in the recess 29. The recess 29 defines shoulders 30 and 31 which limit movement of the shift rail 12. The rail 11 also defines a recess 19 forming shoulders 21 and 32. The groove 33 receives the ball 22 to form a detent stop for the rail 11.

Figure 3:
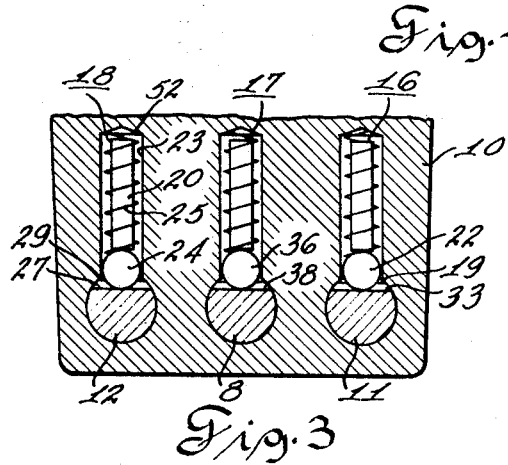
FIG. 3 is a fragmentary cross section view taken on line III–III of FIG. 1.

Fragmentary section shown in FIG. 3 illustrates the three shift rails 12, 8, and 11 with the grooves and recesses formed therein. The detent balls 24 and 36 and 22 selectively seat in the grooves 27, 38 and 33 as the shift rails 11, 8 and 12 slide in the support 10.

Figure 4:
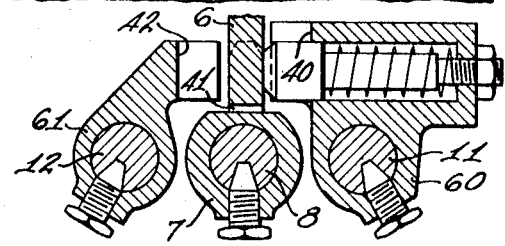
FIG. 4 is a cross section view taken on line IV–IV of FIG. 1.

FIG. 4 illustrates the shift lever 6 extending into the slot in the fork 7. The control lever 6 can be selectively positioned in the slots 40, 41, 42 of the lug 60, fork 7, or lug 61. The selective position of the control lever 6 determines which rail is shifted axially for shifting the transmission.

Intermediate each of the shift rails 8, 11 and 12 are positioned the interlock pins 45, 46 and 47. The interlock pins 45, 46 shift in response to axial movement of one of the rails 8, 11 and 12 to cause the locking of the other two shift rails while the first rail is being shifted. The interlocks 45 and 46 are forced into grooves 48 and 49 or 50 and 51 to operate as interlocks for retaining the remaining two rails in neutral position while the third rail is shifted for gear change of transmission gearings.

The preferred embodiment of this invention has been illustrated and will be subsequently described.

Prior to shifting of the rail the spring resiliently biases the detent element to its mating groove of the shift rail. The control lever 6 is moved to selectively engage the lug 60, 61 or fork 7, and the selected shift rail 11, 12, or 8 is shifted axially.

As the shift rail is moved interlock pins lock the other two shift rails in a neutral position while the selected shift rail moves axially. The detent ball rides over the surface of the recess until it engages another groove. The detent ball is resiliently biased into the second groove. The groove 27 defines the neutral position of the shift rail 12. The grooves 26 and 28 define the shifted position of the shift rail when the detent ball 24 drops into the groove 26 or 28. Continued movement of the shift rail 12 would cause the detent ball 24 to rise up out of the groove and engage the shoulder 30 or 31 which stops the movement of the shift rail. As the detent ball 24 engages the shoulder 30 the shift rail 12 has reached its limit of axial movement thereby forcing the ball 24 to engage the pin 20 against the upper end 52 of the opening 23. Accordingly, the pin 20 engaging the detent ball 24 operates as a stop for the shift rail. The shoulder 30 or 31 which the detent ball 24 engages is dependent upon the directional motion of the shift rail 12.

The lever 6 operates to return the shift rail to its neutral or shifted position depending upon the extent of movement of the lever 6. Accordingly the detent 18 as well as the other detents illustrated, operate as a detent as well as a stop mechanism to limit the maximum axial movement of the shift rail.

The preferred embodiment of this invention is both illustrated and described.

The embodiments of the invention in which an exclusive property or privilege is claimed are defined as follows:

I claim:

1. In a vehicle transmission a shift mechanism comprising a housing means, at least one shift rail mounted for axial movement relative to said housing and adapted for operating a shifting means in said transmission, a detent means fixed relative to said housing including a resiliently biased detent element, a stop element engaging said detent element and limiting the return movement of said resiliently biased detent element, means defining at least one detent groove in said shift rail for receiving said resiliently biased detent element, means defining a recess having shoulders axially extending beyond the axial limits of said detent groove in said shift rail, said shoulders defining the limits of axial movement of said shift rail when engaging said detent element and producing a return movement of said detent element thereby providing a detent means defining at least one detent position of said shift rail and stop limits for maximum movement of said shift rail.

2. In a vehicle transmission, a shift mechanism as set forth in claim 1, wherein said housing means defines an opening, said stop element and said detent element received in said opening defining an axial length greater than the depth of said opening and preventing said element from withdrawing from said recess, said shoulders thereby defining the limits of axial movements of said shift rail when said detent element engages said shoulder.

3. In a vehicle transmission a shift mechanism as set forth in claim 2 comprising, a detent means including a pin of predetermined length defining said stop element for engaging said housing and said detent element to limit the return movement of said detent element and axial movement of said shift rail when said detent element engages the shoulders of said recess.

4. In a vehicle transmission a shift mechanism as set forth in claim 1 comprising, said detent means including a detent element mounted in an opening of said housing, a spring biasing said detent element to an engaging position with said shift rail.

5. In a vehicle transmission a shift mechanism as set forth in claim 1 wherein said shift rail defines three detent grooves to selectively position said shift rail in a neutral and two gearshift positions when said detent element is selectively received in one of said grooves.

6. In a vehicle transmission a shift mechanism as set forth in claim 1 wherein said shift mechanism includes an interlock means comprising pins selectively engaging said shift rails, said shift rails defining grooves to selectively receive pins intermediate said shift rails to thereby permit axial movement of one of said shift rails while retaining the remaining shift rails in predetermined neutral position.

7. In a vehicle transmission a shift mechanism as set forth in claim 1 wherein said transmission includes a plurality of shift rails, a detent means for controlling the movement of each of said shift rails.

8. In a vehicle transmission a shift mechanism as set forth in claim 1 said detent means comprising, means defining a cylindrical opening in said housing, a coil spring received in said cylindrical opening, a ball detent element engaging said coil spring and said shift rail for selective reception within a detent groove of said shift rail to define at least one position of axial movement of said shift rail.

9. In a vehicle transmission a shift mechanism as set forth in claim 1 including a plurality of shift rails, means defining three detent grooves in each of said rails for reception of said detent element to thereby define a neutral and two shift positions of said shift rails when said detent element is received in one of its mating grooves.

10. In a vehicle transmission a shift mechanism as set forth in claim 1 comprising a control lever pivotally supported in said housing, a plurality of shift rails slidably mounted in said housing, means on said lever for selectively engaging one of said shift rails to thereby provide shifting of said shift rails.